United States Patent
Wang et al.

(10) Patent No.: US 11,586,726 B2
(45) Date of Patent: Feb. 21, 2023

(54) SECURE WEB FRAMEWORK

(71) Applicant: CITY UNIVERSITY OF HONG KONG, Kowloon (HK)

(72) Inventors: Cong Wang, Kowloon (HK); Xinyu Wang, Kowloon (HK); Yuefeng Du, Kowloon (HK)

(73) Assignee: CITY UNIVERSITY OF HONG KONG, Kowloon (HK)

( * ) Notice: Subject to any disclaimer, the term of this patent is extended or adjusted under 35 U.S.C. 154(b) by 0 days.

(21) Appl. No.: 17/357,956

(22) Filed: Jun. 24, 2021

(65) Prior Publication Data
US 2023/0004637 A1    Jan. 5, 2023

(51) Int. Cl.
G06F 21/52    (2013.01)

(52) U.S. Cl.
CPC .................. G06F 21/52 (2013.01)

(58) Field of Classification Search
CPC ... G06F 9/44526; G06F 9/2247; H04L 67/02; H04L 9/0861
See application file for complete search history.

(56) References Cited

U.S. PATENT DOCUMENTS

| | | | |
|---|---|---|---|
| 2009/0328063 A1* | 12/2009 | Corvera | G06F 9/54 719/315 |
| 2021/0011742 A1* | 1/2021 | Ganchev | G06F 9/452 |
| 2021/0081545 A1* | 3/2021 | Mulligan | G06F 21/57 |
| 2021/0226934 A1* | 7/2021 | Barnett | H04L 63/0428 |

* cited by examiner

Primary Examiner — Ashokkumar B Patel
Assistant Examiner — William B Jones

(57) ABSTRACT

There is disclosed a method of preventing privileged web browser extensions installed in a web browser from interfering in interactions between a user of the web browser and a web application server accessible via the web browser, the method including transmitting a web browser-intelligible file to the web browser (including a custom element designating an enclave portion); creating a sandboxed page; copying at least part of the enclave portion to the sandboxed page to create a local enclave; embedding the sandboxed page in a first iframe for rendering; embedding the first iframe in a second iframe; providing an API for the local enclave using web-accessible resources for access to entities outside the local enclave; providing a software agent in the second iframe to act as a proxy between the first iframe and external entities; and encapsulating the second iframe in a shadow document object model associated with a host page.

17 Claims, 7 Drawing Sheets

SECURE WEB FRAMEWORK

FIELD OF THE INVENTION

The present invention relates to a method of preventing privileged web browser extensions installed in a web browser from interfering in interactions between a user of the web browser and a web application server accessible via the web browser, as well as computer program code, a computer readable medium, and a web browser extension.

BACKGROUND OF THE INVENTION

Modern browsers allow and even encourage users to install extensions to support more useful features, such as search toolbars, advertisement blockers, password managers, and so on. However, the ubiquity of browser extensions also raises security and privacy concerns, as the extensions are granted privileged capabilities and inherently have access to sensitive user data. It has been identified with strong evidence that such malicious extensions can produce sophisticated attacks, including credential hijacking, spying, distributed denial of service (DDOS), advertisement injecting, man-in-the-browser attacks, payment frauds, and so on. Consequently, the security and privacy concerns of browser extensions are becoming increasingly pressing to an enormous user base, which is also expected to grow continuously.

To address the above pressing concerns, browser vendors leverage pre-publication review procedures to detect malicious and vulnerable extensions on a large scale. Representative malicious and vulnerable extension detection systems include WebEval, EmPoWeb, VEX, Sentinel, Hulk, and Ex-ray. Also, typical detection tools include behaviour-based detection, static resources analysis, machine learning based detection, and comprehensive approach.

In spite of the efforts made by browser vendors, there still exists an arms race between the attacker and defenders, and it is always easier for the attackers to derive more sophisticated attacks. As an illustrating example, it is shown in "*Trends and lessons from three years fighting malicious extensions*", N. Jagpal et al, 24$^{th}$ {USENIX} Security Symposium, 2015, pp. 579-593, that an attacker can work out immune, crafty, dynamic malicious extensions that bypass almost all the existing detection mechanisms. Aside from the inherent limitation of detection-based defence strategy, the process of publishing an extension is under potential risks because of the centralized online stores such as Chrome Web Store and Firefox Browser Add-ons. When a developer account is compromised, the attacker can leverage the privileges as well as the reputation of the victim account to publish a buggy extension or tricky patch.

From the perspective of users, though the installation of extensions fully relies on the consent of users, it is still difficult for users to identify malicious extensions from hard-to-verify information posted to the online store such as descriptive text, supplementary screenshots, and detailed user reviews as well as coarse-grained pop-up specifying all the privileges of the extension to be installed. Once the extension is installed with user consent, malicious browser extensions could access the user data stealthily without any post-installation notification to users. Clearly, existing industry-deployed practices that mostly rely on advanced detection mechanisms provided by browser vendors plus consents from users are not sufficient to protect users from malicious browser extensions. Moreover, with the current browsing environment where browser extensions are adopted by users broadly, web applications become a disadvantaged party that gains no benefit from the browser extensions but takes the full risk of potential data exfiltration and hijacking. To defend the threats from malicious extensions, web application providers are eager to re-balance web applications and browser extensions by empowering the ability to deny privileged access from browser extensions.

The present invention aims to address problems such as this in the prior art.

SUMMARY OF THE INVENTION

According to a first aspect of the present invention, there is provided a method of preventing privileged web browser extensions installed in a web browser from interfering in interactions between a user of the web browser and a web application server accessible via the web browser, the method comprising: at the web application server, transmitting a web browser-intelligible file (which is essentially a web page that may include but is not limited to any or all of: HTML, Cascading Style Sheets [CSS] and Javascript) to the web browser, the file including a custom element that designates a portion of the file as an enclave portion, the content of which is desired to be protected from interference by privileged web browser extensions; at the web browser: processing the file to identify the enclave portion; creating a sandboxed page; copying at least part of the enclave portion to the sandboxed page to create a local enclave; embedding the sandboxed page in a first iframe (typically known as an isolation page) for rendering; embedding the first iframe in a second iframe (typically known as a proxy page); providing an application programming interface, API, for the local enclave using web-accessible resources (typically via the web accesible resources manifest property) for access to entities outside the local enclave; providing a software agent in the second iframe to act as a proxy between the first iframe and external entities; and encapsulating the second iframe in a shadow document object model, DOM, associated with a host page, whereby the local enclave can be displayed to the user and interacted with by the user, but is protected from interference by the privileged web browser extensions. Various of these features such as the second iframe and the API may in theory be omitted, although doing so can reduce the effectiveness of the method and open the web browser up to various attacks. It may still be desired to provide some of these features rather than none.

The reference above and herein to transmitting data to the web browser can if appropriate be considered shorthand for transmitting data to a computer which provides an execution environment (such as operating system) in which the web browser is executing, and causing the transmitted data to be communicated by the communicator, for example via the execution environment, to the web browser code, and so on. Web browser extension preferably connotes any form of plug-in to a web browser which extends the functionality in an appropriate way, for example by accessing web pages directly and/or handling events of various types. By 'privileged' web browser extension, no particular technical limitation is intended to be implied, but we refer for example to web browser extensions which have been granted broad or unlimited access by the user and/or web browser. The shadow DOM is normally attached to the DOM of the host page, and normally attached at, directly adjacent to, within, or in place of any object in the DOM associated with the custom element. The term 'host page' normally refers to the page created by the web browser corresponding to the received file.

Other attempted solutions to protect web browser environments from malicious or bugged privileged (or otherwise) web browser extensions have often involved requiring custom modifications to the web browser, the web application servers, or more extreme methods such as hardware-based Trusted Execution Environments (TEE). Such methods are of course expensive, difficult and generally unwieldy. By contrast, the present method takes a number of existing browser features which in themselves are highly flawed in terms of security, and combines them into a synergistic whole which provides a relatively high degree of security against malicious privileged web browser extensions.

In a refinement of the above method, the transmitted file may include a plurality of enclave portions, and the method may comprise creating a separate sandboxed page, iframe and shadow DOM for each enclave portion. Where appropriate, data is divided between different enclaves, and where appropriate, it is centralised. The method may extend to multiple files/host pages and multiple enclaves for each, for example. These features can improve the flexibility of the system.

The method may further comprise providing a web browser extension programmed to carry out at least one of the steps of: processing the file, creating a sandboxed page, copying at least part of the identified enclave portion, providing an API, embedding the sandboxed page, and encapsulating the iframe. Preferably the web browser extension carries out most of these steps, and most preferably all of them. One or more, or all, of these steps may alternatively be implemented by or within the web browser itself, or spread across a plurality of web browser extensions, or otherwise. It is especially convenient to implement the present method in a web browser extension, and as the privileges afforded to all web extensions grows or shrinks, the power of the enclave-managing web browser extension grows or shrinks to match.

Preferably the web browser extension includes a background page, and the agent is configured to communicate with the background page using the runtime.sendMessage function (or any other appropriate communication protocol). It is convenient/possible to do so because the proxy page belongs to the web accessible resources.

The method preferably further comprises using the tabs.sendMessage function to send messages from the background page to content scripts (or other components). Preferably also the content scripts talk to the proxy page (second iframe) via the runtime.sendMessage function (or otherwise), and the proxy page uses the window.postMessage to interact with the isolation page (first iframe).

The method preferably further comprises (at the web application server) generating a first verification token whose value depends on the content of the enclave portion, and transmitting the first verification token to the web browser (preferably using a custom HTTP header); and (at the web browser) after the local enclave is created, generating a second verification token whose value depends on the content of the local enclave; comparing the first verification token and the second verification token; and outputting an alert if the first verification token and the second verification token do not match.

Public/private cryptography methods can be used to generate the verification tokens; in this sort of system, the first and second tokens do not need to be numerically identical in order to be compared, and any other appropriate verification process can be used. For example, the server can generate a digital signature for the contents of the enclave portion in the file using a private key, and this can be verified by the web browser using a public key, and so on. Alternatively, generating the first and second verification token may comprise generating a message digest of the enclave using a hashing (or appropriate checksum) function. Preferably the verification tokens are a fixed size message digest, and preferably SHA256 or a variant thereof is used as a hashing function.

Preferably the method further comprises (at the web application server) receiving a request for content from the web browser, and generating the web browser-intelligible file in response to the request for content, wherein the first verification token is included within the file before it is transmitted to the web browser. As before, the token is preferably sent using a custom HTTP header.

The token could be generated and included in the file as part of the providing step (for example as an adaptation to a pre-existing web application server), but alternatively the method may further comprise providing (at the web application server) a verification proxy module that is programmed to: receive the generated web browser-intelligible file; carry out the step of generating the first verification code; insert the first verification code into the file; and output the file for transmission to the web browser. Effectively the proxy module is a reverse proxy, which is preferably built on top of Node.js, but may be provided elsewhere or by other means. This can make the process of enclave verification entirely transparent to otherwise conventional web application servers, allowing extensive backwards-compatibility.

Preferably the method further comprises processing the contents of the local enclave to correct for any modifications in appearance caused by moving it to the local enclave, for example as a result of some CSS selectors becoming invalid, such as descendant combinatory and child combinatory.

The method may in particular further comprise using the shadow DOM to determine the position of the contents of the local enclave; and adjusting style settings for the first iframe in dependence on the determined position. The method may further comprise determining style settings for the second iframe (typically the proxy page), and making consequent adjustments to style settings for the first iframe (typically the isolation page), and so on. The method may in particular comprise calling the window.getComputerStyle function to (re)calculate the styles for the local enclave as displayed.

The method may further comprise providing, at the web browser, an API to execute code on the host page and to return the results of the code execution to the sandboxed page. This can allow actions to be carried out in the context of the host page at the direction of code in the local enclave without creating a security breach.

Creating the sandboxed page preferably further comprises copying at least one browser object model attribute to the sandboxed page from the host page; and wherein the method further comprises detecting a change to a browser object model attribute on the sandboxed page, and copying the changed browser object model attribute back to the host page. This can help create a relatively seamless browsing experience relative to a version of the host page without the enclave.

The method may further comprise (at the web browser) handling events relating to cookie data so as to provide cookie functionality to the sandboxed pages as if they were in the same domain as the host page. For example, handling events relating to cookie data may further comprise handling onBeforeSendHeaders and onHeadersReceived events for both the host page and the sandboxed page, so as to maintain a mirror copy of the cookie data and to transmit the correct version of the cookie data when required. Preferably the mirror copy of the cookie data is stored persistently using local storage API calls.

As a further security measure, the method may further comprise (at the web browser) disabling event bubbling in the local enclave so as to prevent event hijacking.

The method may further comprise executing a script in the sandboxed page after the execution of other scripts, on detection of a first specific keyword (typically 'final').

In another case, the method may further comprise executing a script in the sandboxed page while providing the API of the host page, on detection of a second specific keyword (typically 'extend').

The method may further comprise (at the web browser) causing a specific indicator to be displayed in the toolbar to indicate whether the current focus is in a local enclave. This can help a user guard against exploits which spoof the UI of content within the enclave.

In another aspect of the invention, there is provide a method of operating a computer to prevent privileged web browser extensions installed in a web browser executing on the computer from interfering in interactions between a user of the web browser and a web application server accessible via the web browser, the method comprising: receiving a web browser-intelligible file, the file including a custom element that designates a portion of the file as an enclave portion, the content of which is desired to be protected from interference by privileged web browser extensions; processing the file to identify the enclave portion; creating a sandboxed page; copying at least part of the enclave portion to the sandboxed page to create a local enclave; embedding the sandboxed page in a first iframe for rendering; embedding the first iframe in a second iframe; providing an application programming interface, API, for the local enclave using web-accessible resources for access to entities outside the local enclave; providing a software agent in the second iframe to act as a proxy between the first iframe and external entities; and encapsulating the second iframe in a shadow document object model, DOM, associated with a host page, whereby the local enclave can be displayed to the user and interacted with by the user, but is protected from interference by the privileged web browser extensions.

As before, the received file may include a plurality of enclave portions, and the method may comprise creating a separate sandboxed page, iframe and shadow DOM for each enclave portion. The method may further comprise providing a web browser extension programmed to carry out at least one of the steps of: processing the file, creating a sandboxed page, copying at least part of the identified enclave portion, providing an API, embedding the sandboxed page, and encapsulating the iframe.

Preferably the method further comprises receiving a first verification token whose value depends on the content of the enclave portion; after the local enclave is created, generating a second verification token whose value depends on the content of the local enclave; comparing the first verification token and the second verification token; and outputting an alert if the first verification token and the second verification token do not match. Generating the second verification token comprises generating a message digest of the enclave using a hashing function.

Other method steps may be provided as aforesaid.

In a further aspect of the invention, there is provided a method of operating a web application server to facilitate preventing privileged web browser extensions installed in a web browser from interfering in interactions between a user of the web browser and the web application server, the method comprising: receiving a request for content from the web browser; generating a web browser-intelligible file in response to the request for content, wherein the generated file includes a custom element that designates a portion of the file as an enclave portion, the content of which is desired to be protected from interference by privileged web browser extensions installed in the web browser; and transmitting the file to the web browser.

The method may further comprise generating a verification token whose value depends on the content of the enclave portion, and transmitting the verification token to the web browser. Generating the verification token preferably comprises generating a message digest of the enclave using a hashing function. Preferably the verification token is included within the web browser-intelligible file transmitted to the web browser.

The method may further comprise providing a verification proxy module that is programmed to: receive the generated web browser-intelligible file; carry out the step of generating the first verification code; insert the first verification code into the file; and output the file for transmission to the web browser.

In another aspect of the invention there is provided a computer readable medium tangibly embodying computer program code which, when executed on a computer including at least one processor and associated memory, causes the computer to perform a method as aforesaid (for example in relation to the web browser and/or in relation to the web application server).

In a further aspect of the invention, there is provided a web browser extension for preventing privileged other web browser extensions installed in a web browser from interfering in interactions between a user of the web browser and a web application server accessible via the web browser, the web browser extension comprising: a processing module configured to process a received web browser-intelligible file, wherein the web browser-intelligible file includes a custom element that designates a portion of the file as an enclave portion, wherein the content of the enclave portion is desired to be protected from interference by privileged web browser extensions, and wherein processing the file comprises identifying the enclave portion; an enclave creation module configured to create a sandboxed page, to copy at least part of the enclave portion to the sandboxed page to create a local enclave, to embed the sandboxed page in a first iframe for rendering, to embed the first iframe in a second iframe, to provide a software agent in the second iframe to act as a proxy between the first iframe and external entities, and to encapsulate the second iframe in a shadow document object model, DOM, associated with a host page; and an application programming interface, API, for providing access from the sandboxed page to entities outside the local enclave, wherein the API comprises web-accessible resources, whereby the local enclave can be displayed to the user and interacted with by the user, but is protected from interference by the privileged web browser extensions.

In a yet further aspect of the invention there is provided a web application server comprising: an application server module configured to receive a request for content from a web browser, and to generate a web browser-intelligible file in response to the request for content, and a communications module for transmitting the generated file to the web browser, wherein a portion of the file is desired to be protected from interference by privileged web browser extensions installed in the web browser, and wherein the application server module is configured to include a custom element in the file that designates the portion of the file as an enclave portion.

In another aspect of the invention, there is provided a software module for use with a web application server, comprising: a reverse proxy module configured to receive a web browser-intelligible file generated by the web application server in response to a request for content from a web browser, wherein the generated file includes a custom element that designates a portion of the file as an enclave portion, the content of which is desired to be protected from interference by privileged web browser extensions installed in the web browser; a verification token generator configured to generate a verification token whose value depends on the content of the enclave portion in the generated web browser-intelligible file, wherein the reverse proxy module is further configured to insert the verification token into the web browser-intelligible file and to transmit the modified file to the web browser.

Although the embodiments of the invention described herein with reference to the drawings may comprise computer-related methods or apparatus, the invention may also extend to program instructions, particularly program instructions on or in a carrier, adapted for carrying out the processes of the invention or for causing a computer to perform as the computer apparatus of the invention. Programs may be in the form of source code, object code, a code intermediate source, such as in partially compiled form, or any other form suitable for use in the implementation of the processes according to the invention. The carrier may be any entity or device capable of carrying the program instructions. The computer program code as aforesaid may be provided in any other appropriate and tangible form (such as a computer readable signal or encoded onto any general purpose or other computing device or hardware). The computer readable medium may, for example, be a CD, DVD, Blu-ray® disc, or similar, or a hard disk, solid state disk, integrated circuit, and so on.

Although various aspects and embodiments of the present invention have been described separately above, any of the aspects and features of the present invention can be used in conjunction with any other aspect, embodiment or feature where appropriate. For example apparatus features may where appropriate be interchanged with method features. References to single entities should, where appropriate, be considered generally applicable to multiple entities and vice versa. Unless otherwise stated herein, no feature described herein should be considered to be incompatible with any other, unless such a combination is clearly and inherently incompatible. Accordingly, it should generally be envisaged that each and every separate feature disclosed in the introduction, description and drawings is combinable in any appropriate way with any other unless (as noted above) explicitly or clearly incompatible.

BRIEF DESCRIPTION OF THE DRAWINGS

The invention will now be described further, by way of example, with reference to the accompanying drawings, in which.

DETAILED DESCRIPTION OF THE PREFERRED EMBODIMENT(S)

An embodiment of a secure web framework will now be described, relating in particular to a web browser extension which can prevent other privileged web browser extensions from interfering with an interaction between a user of the web browser and a web application server.

Figure 1:
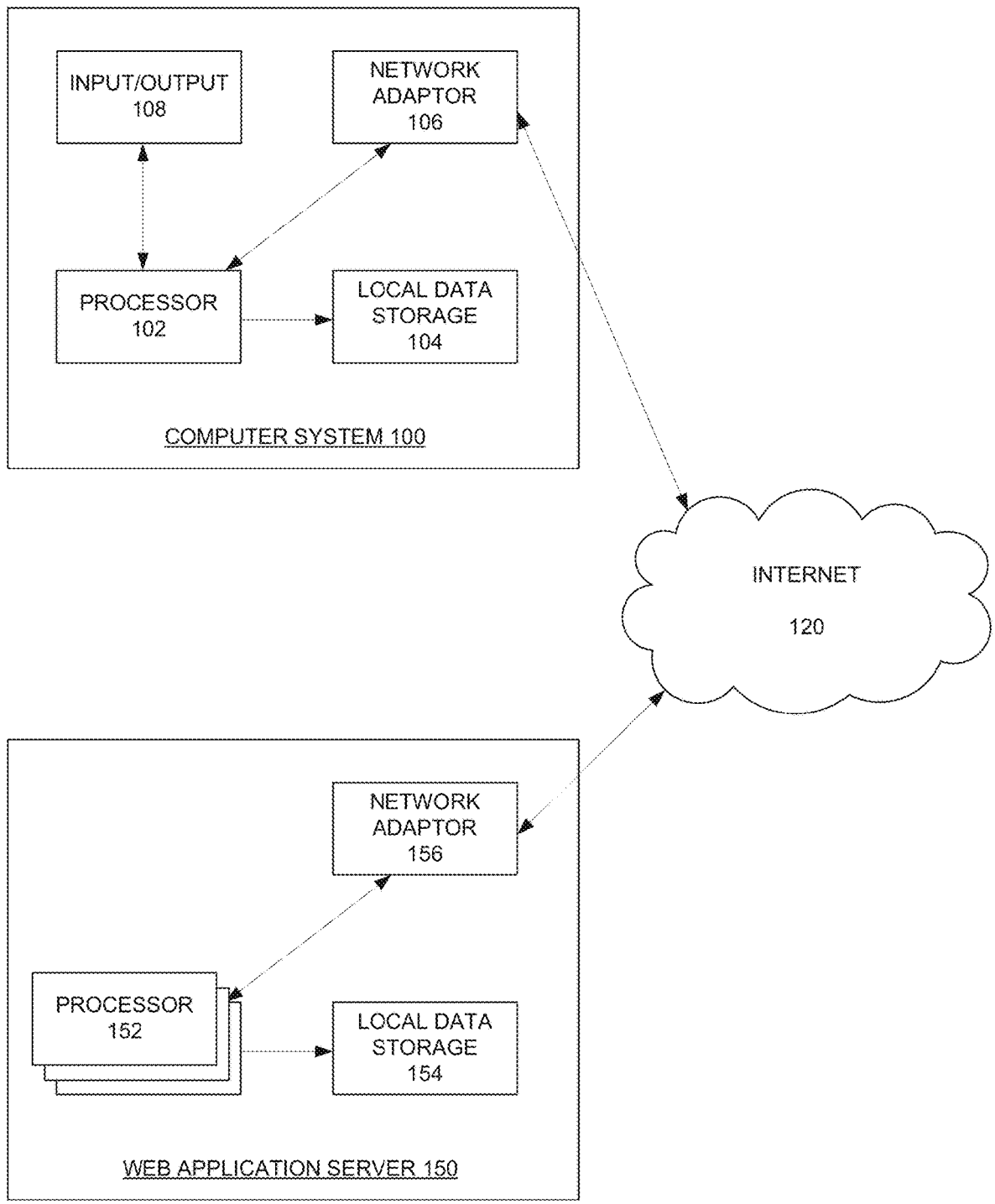
FIG. 1 is a schematic of system suitable for use with a secure web framework.

FIG. 1 is a schematic of system suitable for use with the secure web framework. A user computer system 100 includes a processor 102, local data storage 104 (for example storing computer program code and computer program data, and so on), a network adaptor 106 (such as an Ethernet adaptor), and input/output interfaces 108. The computer system 100 is connectable via the Internet 120 to a web application server 150, which includes one or more processors 152, local data storage 154 (again including computer program code and program/server data) and a network adaptor 156 (or series of network adaptors). In use, requests and responses are transmitted between software running on the computer system 100 and software running on the web application server 150.

Figure 2:
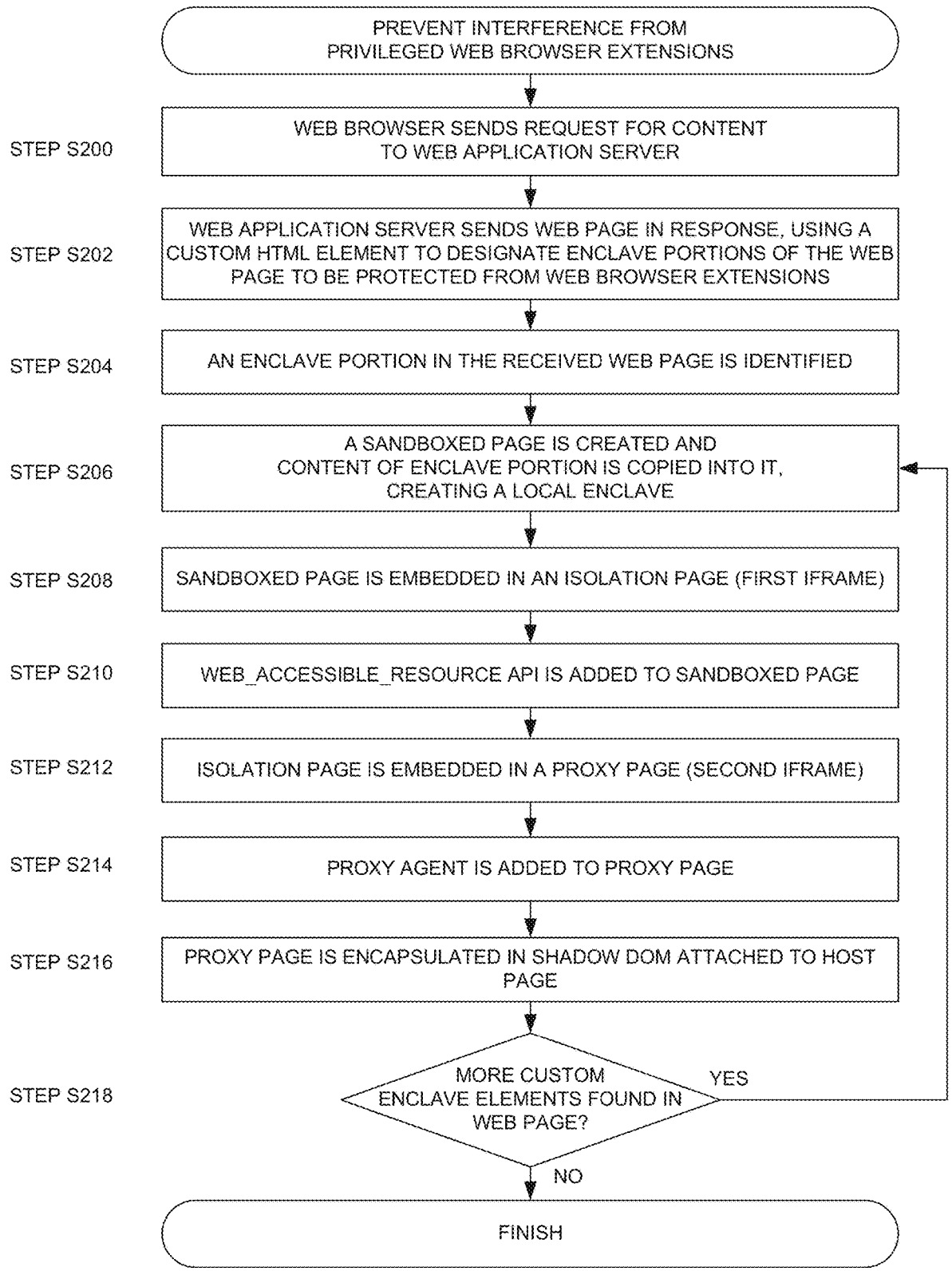
FIG. 2 is a flowchart illustrating the creation of a secure web framework.

FIG. 2 is a flowchart illustrating the creation of a secure web framework, in the context of web extensions installed on a web browser running on the processor of the computer system 100 of FIG. 1. In Step S200, the web browser running on the computer system sends a request for content (such as a request to load a particular web page) to the web application server. In Step S202, the web application server sends a web page in response, using a custom HTML, element to designate enclave portions of the web page to be protected from web browser extensions. In Step S204, the enclave web browser extension (or any other appropriate software process) identifies an enclave portion in the received web page (by identifying the custom element).

The process of creating a local enclave then begins, by creating a sandboxed page and copying the content of the identified enclave portion into it (S206); embedding the sandboxed page into a first iframe ("isolation page") (S208); adding an API to the first iframe using the web accessible resource manifest property (S210); embedding the first iframe (isolation page) into a second iframe (S212); adding a proxy agent to the second iframe (proxy page); and encapsulating the second iframe (proxy page) in a shadow DOM which is attached to a relevant part of the host page DOM. If any more custom elements are found in the web page (S218) then the process repeats from step S206.

The secure web framework will now be described in more detail, and the significance of the above-mentioned features as regards creating a secure environment will be explained, with reference to a specific embodiment referred to as "WebEnclave".

WebEnclave is believed to be the first web framework that protects users from the attack of a full-privileged extension with the support of web application developers. From a high-level point of view, web application providers are capable of preventing browser extensions from accessing specific parts of their developed web applications with the assistance of WebEnclave. In practice, WebEnclave provides friendly fine-grained APIs for developers to isolate specific sensitive parts to be protected while remaining their original functionalities and appearances. Moreover, WebEnclave allows users to balance the security and functionality that puts the users back in control, for example disabling protection when occasionally browsing certain sites that require the regular functionalities of browser extensions.

An important part of WebEnclave is a secure area called software enclave where web application providers can put sensitive codes and data. Comparing with the Intel hardware-based enclave, the software enclave is a software-based Trusted Execution Environment (TEE) that purely builds on top of a robust browser and only relies on web features and browser extensions. Web developers can easily utilize this primitive by incorporating the custom element <web-enclave> with web codes to be protected. On the user side, the design is implemented using a browser extension which in one embodiment is named "WebEnclave" extension (and will be referred to as such hereafter). When a user with WebEnclave extension installed browses a web application constructed with WebEnclave, all the data and behaviours in the software enclave will be fully protected.

By toggling the extension icon on the browser toolbar, users are allowed to enable or disable the protection at a site according to their preferences over the functionality or the security. Note that the terms 'the software enclave' and 'the enclave' are used interchangeably in the following description.

Technically, the design of WebEnclave follows two design principles. WebEnclave aims to guarantee the confidentiality of the enclave while allowing web developers to use most web features as usual. To achieve that, the novel design of the enclave is based on native browser features that take into account both security and usability. As a consequence, content script injection, web request interception, and many other privileges of browser extensions, as well as web features including DOM manipulation, event listener, and exception handling, cannot normally access the content in the enclave. Users can benefit from this security without relying on specific hardware or installing modified browsers.

Aside from confidentiality, the integrity of the enclave is pre-verified before the initialization on the user end. The underlying reason for this extra verification is to prevent malicious extensions from pre-emptively modifying the loaded web page to compromise the initialization of the enclave. Thus, the verification protocol between the client-side and webserver has been developed to verify the status of enclaves, including the number, the order, and the detailed contents. Web pages that fail to pass the verification procedures are interrupted with a compulsory redirection to a warning page.

It will be appreciated that the design and implementation of WebEnclave is far from trivial. For example, due to the stringent isolation strategy that denies access to the enclave from browser extensions, most web features such as DOM operations and cookies cannot work well as intended. To this end, effort has been made to restore these web features and keep the original usages. Moreover, to ease the development burden on web application developers, serious endeavours have been made to achieve compatibility with existing web applications and popular web frameworks. In particular, developers can easily create secure web applications either from existing codes or famous web frameworks such as AngularJS, React, and Vue. Furthermore, the performance overhead caused by WebEnclave was found to be negligible to users in most scenarios.

Some further background will be given before returning to the present embodiment:

Modern web browsers, including Chrome, Opera, Firefox, and Microsoft Edge, support extensions written using standard web technologies like HTML, Javascript, and CSS. Browser extensions, browser vendors, and developers form an operation ecosystem to serve users for a better browsing experience. Currently, developers build browser extensions and submit them to browser vendors for vetting. Once approved, these extensions are presented in an online extensions gallery and provided for users to download and install.
Extension Architecture In short, a browser extension is a zip archive for distribution and installation that consists of a manifest file, javascript codes, and corresponding static resources. The manifest.json file lists the components tightly integrated to browser behaviours and the permissions that the extension applies to access. The rest components can be categorized as the following parts:

Background Page. By registering a web page or script in the manifest.json file under the background field, extensions run the background page as a long-running process during whole lifecycle. Additionally, the background page has the ability to call all privileged APIs depending on the declared permissions. In general, developers use the background page to maintain long-term states and interact with users via events handlers.

Content Scripts. Browser extensions inject content scripts into the context of a particular web page to read and modify the inside web contents via the standard DOM API. For security reasons, the content script runs in an isolated world with limited access to extension privileges. Generally, content scripts serve as a bridge to communicate between the web page and browser extensions.

UI Component. Browser extensions support two kinds of components to regulate the UI of browsers. In the first kind, custom styles are defined in the manifest file to change the browser interface, such as the toolbar, the omnibox, and the address bar. Furthermore, developers can customize the behaviours of the browser interface by overwriting the corresponding event handlers. Another kind is the custom pages triggered by some specific events, such as the popup page, the options page, and the devtools page, for example. By customizing these UI components, browser extensions significantly enhance the user experience when interacting with users.
Privileged Capabilities Browser vendors define a permission mechanism to rule the behaviour of browser extensions. To use the privileged features, developers are required to declare all proposed permissions in the manifest file under the permissions field. Specifically, permissions are specific strings that either refer to a range of browser features or present match patterns of URLs desired to access. For example, with the permissions cookies and history, the extension obtains the ability to access web application cookies and user browsing history. Moreover, the host permission >all_urls>, which is selfevident and straightforward, implies that the extension is granted full access to any websites running in the browser.

Figure 3:
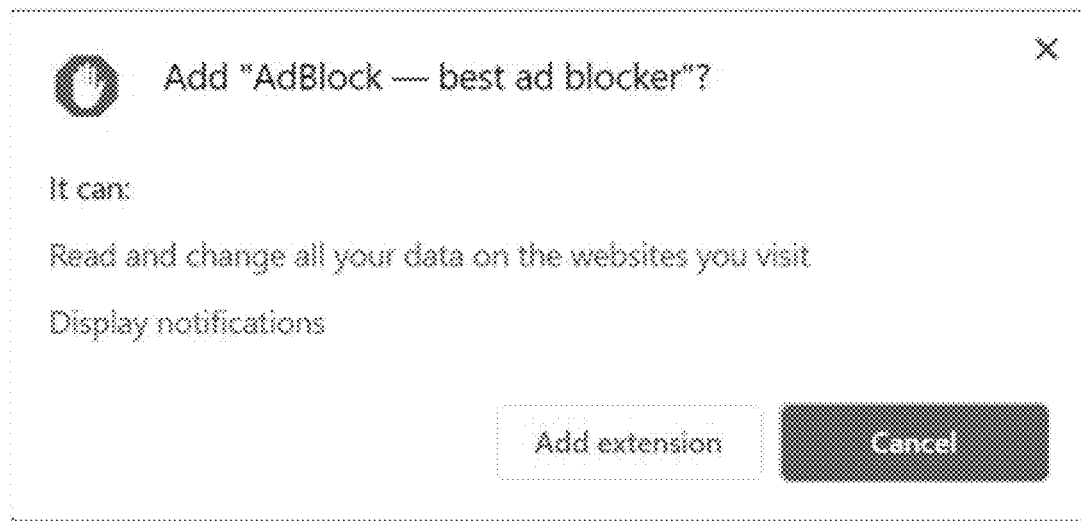
FIG. 3 is a screenshot of an example extension in the Chrome web store that has the capability to access user data of visited websites.

FIG. 3 is a screenshot of an example extension in the Chrome web store that has the capability to access user data of visited websites.

Browser creators insist developers follow the principle of least authority (POLA) that only allocates the minimal permissions. However, because of some large-grained host permissions like <all_urls>, it is difficult to identify the extensions that abuse permissions, which makes the principle not strictly observed as expected. For instance, many Chrome extensions can "Read and change all your data on the websites you visit" including, for example, a simple calculator. A recent report revealed that 21% of 115,000 extensions studied have this capability, with a total of 615 million downloads. This finding has been confirmed by an initial study of the top 20 Chrome extensions, which showed that 90% of them have such capability. When installing an extension, browsers present a description of privileges and ask the user whether to install it. However, this summary is too coarse-grained for users to make the installation decision solely based on the prompt that cannot describe explicit permissions and potential risks.

Google, for example, has developed several strategies to protect users from malicious extensions, but the issue is still not well mitigated. A vetting process on malicious code can reveal its malicious intention. However, in a real attack scenario, attackers could use advanced techniques such as code obfuscation and dynamic script loading to evade this process, which has been observed in real attacks. Furthermore, the developer account is too powerful, and the holder can either publish or update extensions without any other credentials. This update pack will automatically install without further notices on the client-side, which involves potential risks.

A threat model used here considers malicious browser extensions that grant arbitrary permissions required to attack. This threat is representative and widespread in practical. On one hand, the attacker elaborates the malicious code and disguises the malicious extension as an ordinary functional one. A report from Google confirms that nearly 10% of all submitted extensions had been detected as malware from 2013 to 2015. On the other hand, the threat, which is easy to be overlooked, comes from a set of benign but buggy extensions. Unlike malware, these extensions are harmless in a stand-alone environment and can easily pass the review process provided by browser vendors. Once triggered by certain factors, such as visiting suspicious webs or processing a malware download, such extensions will turn into an accomplice to exfiltrate sensitive user data. A recent report shows that through a static analysis on 66,401 Chrome extensions, approximately 5% of extensions are potentially suspicious ones of this kind.

The essential trust is anchored to web application providers, who are assumed to provide security web services faithfully. Specifically, we assume that web servers are trusted and robust, while web applications successfully adapt our proposed framework. From the perspective of users, our system relies on the trusted computing base (TCB) including the operating system and the browser. When users browse the web, the WebEnclave extension is assumed to be enabled.

Challenge

Given the threat model, the immediate challenge is to resist the overwhelming privileges of browser extensions. These privileges are closely related to the components of extensions, especially the background page that always runs as a background process and content scripts that are able to control web applications. The four most popular methods of privilege exploitation are listed below:

1) Code Execution. With the tabs permission granted in the manifest file, the extension can execute arbitrary Javascript codes in any opened tab via the tabs.executeScript function, and return the result. This operation can bypass the browser security mechanisms, including Content Security Policy (CSP) and Same Origin Policy (SOP).

2) Web Interception. With the webRequest and corresponding host permissions specified, the extension can use the chrome.webRequest API to intercept the web requests by registering event listeners. Moreover, the extension supports fine-grained manipulation on requests, such as cancellation and modification. With this ability, the attacker can steal private data from requests and tamper with user behaviours.

3) Content Scripts Injection. An extension allows a developer to register a Javascript script in the manifest as the content script. When the user visits a page that matches the URL patterns, the content scripts would automatically run on this page. After the injection of malicious scripts, the attacker can read arbitrary data on this page, such as the form data and Javascript variables.

4) Cookie Inspection. With the cookies permission granted, the extension is allowed to query and modify cookies using the chrome.cookies API. This privileged API can retrieve cookies that belong to any web host, regardless of the domain knowledge. With this ability, the attacker can conduct the cookie hijacking and act on behalf of the user.

The above-mentioned privilege exploitation methods are hard to mitigate directly, as the browser extension has an independent execution context that is transparent to the web applications. Due to browser mechanisms, web applications cannot disable or even discover the installed extensions. Moreover, when multiple extensions are installed, none of them can constrain the behaviour of other extensions.

An overview will now be given of the whole system.

The general goal of WebEnclave is to balance the trade-off among security, usability, and performance:

Security: WebEnclave provides the enclave as the primitives to build secure web applications, so the enclave's confidentiality and integrity are of vital importance to the defence of the threat model. The security goal is to protect the web parts in the enclave from malicious extensions. Specifically, WebEnclave can deny unauthorized access to the enclave and protects the communication from eavesdropping. Besides, WebEnclave should ensure that the enclave's code is never tampered with. Once the violation of a security constraint is detected, WebEnclave immediately interrupts the browsing and alerts the user. It should be noted that any parts of the system outside the enclave are regarded as untrusted parts that are not part of the security goal.

Usability: WebEnclave aims to achieve compatibility with existing web applications and also satisfy advanced requirements from web developers. More concretely, the proposed framework aims to adapt to standard web server software including Apache, Nginx, and Microsoft IIS, as well as frontend frameworks such as AngularJS, React, and Vue. WebEnclave should not significantly increase development overhead, regardless of re-composing an existing web application or building a fresh one.

Performance: WebEnclave does not typically affect the user experience of visiting web applications and the operational cost on the side of web application providers. Concretely, WebEnclave typically minimizes perceptual changes of users, for example the interaction time between the user and the web application, including the loading and rendering. The proposed framework generally aims to provide an experience where the user cannot distinguish whether WebEnclave is enabled. Moreover, WebEnclave does not typically cause substantial degradation of the server-side performance, such as the latency and throughput.

Architecture

Figure 4:
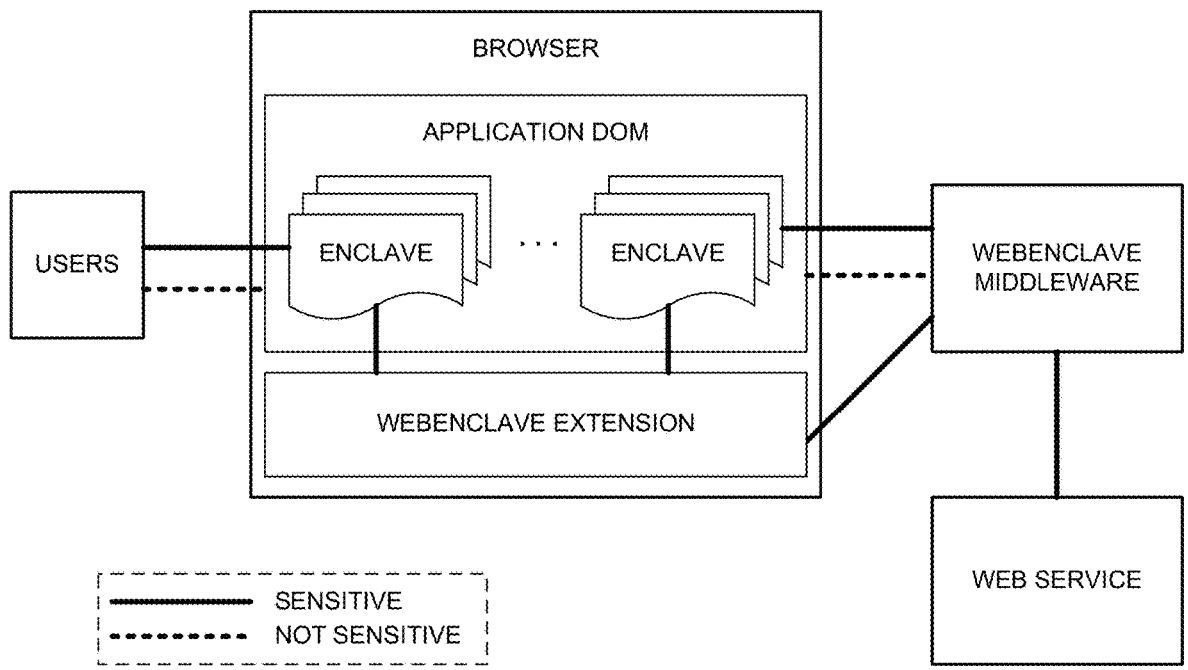
FIG. 4 is a schematic of the overall software architecture of WebEnclave.

FIG. 4 is a schematic of the overall software architecture of WebEnclave. As shown in the figure, the proposed framework consists of the following three components:

WebEnclave extension: WebEnclave runs as a browser extension installed in the browser of users and takes responsibility for critical security operations. When users visit secure web applications developed on top of the present framework, the WebEnclave extension initializes and verifies the enclaves to protect inside web parts from being either read or modified by any external entity.

Software Enclave: the software enclave is an important part of the WebEnclave that allows web developers to isolate sensitive web parts to be protected. It is a custom element represented by the <web-enclave> tag that allows developers to customize the appearance and behaviours inside. To prevent data exposure, developers should guide users only to perform sensitive operations in the enclave.

WebEnclave middleware: WebEnclave middleware is built to support the WebEnclave extension for the verification of the enclave. Developers can directly deploy the WebEnclave middleware as a reverse proxy to enable the present security features without modification of backend codes.

To build secure web applications with enclaves, developers are required to specify all sensitive web components in the form of HTML, Cascading Style Sheets (CSS) and Javascript, and put them into the enclave for encapsulation. For instance, Code Extract 1 below demonstrates a web page for user authentication. In the enclave, developers can build and decorate web elements as usual and use Javascript to implement corresponding functionalities. Due to the isolation, developers are forbidden to access external resources directly, and some advanced web functionalities are not working. To mitigate the above limitations, specific APIs are provided for developers which can be enabled by the extend and final keywords as illustrated in Code Extract 1 below. More detail is provided later on the implementation of these features.

```
//html code with webEnclave
<web-enclave>
<div id="loginDiv">
<p>username: <span><input id="user"/></span></p>
<p>Password: <span><input id="psw" type="password"/></span></p>
<p><button onclick="login( );">Login</button></p>
</div>
<style> . . . </style>
<script extend final>
function login( ){ . . . }
</script>
</web-enclave>
```

Code Extract 1: HTML Code with WebEnclave Scripts

WebEnclave is compatible with all major backend languages and web server software. Usually, a recommended and easy-to-deploy scheme is to use the present middleware to be a reverse proxy that performs necessary security operations during the delegation of requests and responses. The middleware is designed to be a general solution that incurs more performance overhead compared to manually implementing necessary operations and security algorithms. When in a performance-sensitive scenario, developers can also modify the backend codes to implement necessary security operations to gain better performance.

During initialization, WebEnclave collects all the enclave elements and creates corresponding isolation zones to render the sensitive components. For each enclave, WebEnclave verifies the inside web contents to guarantee integrity. To render the UI, WebEnclave uses the Shadow DOM to seamlessly replace the original appearance with the components in the enclave.

Figure 5A:
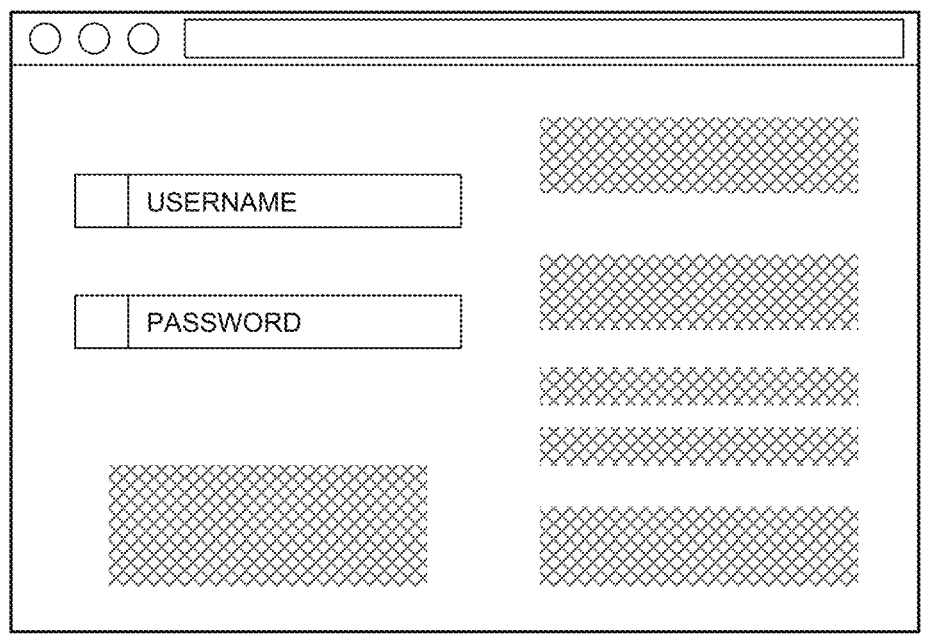
FIGS. 5(a) and 5(b) are screenshots illustrating the difference between trusted and untrusted views of an enclave in a host page.
Figure 5B:
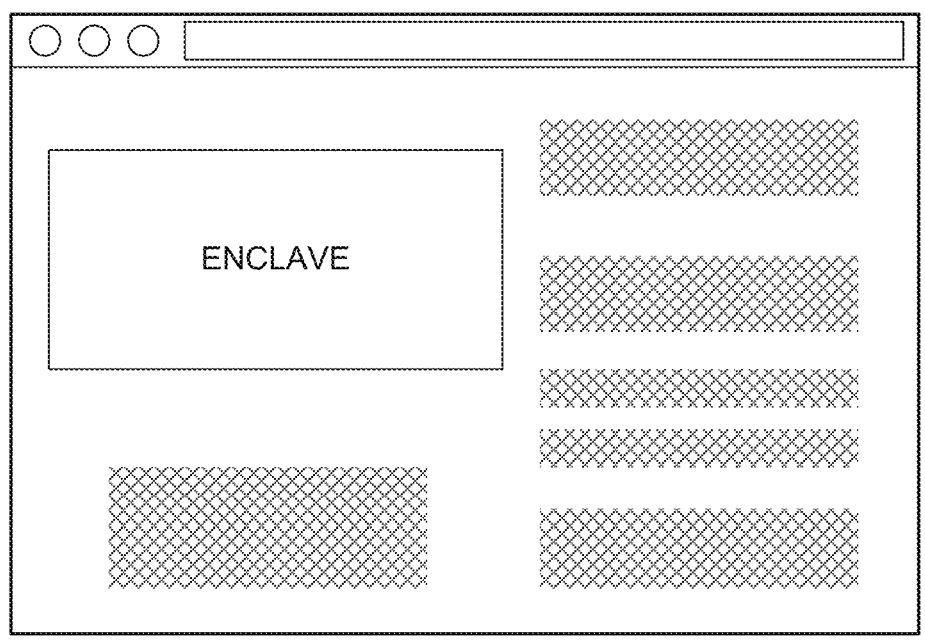

FIGS. 5(a) and 5(b) are screenshots illustrating the difference between trusted and untrusted views of an enclave in a host page. Specifically, a trusted view—such as is shown in FIG. 5(a)—is prepared for users to interact with the web application. In contrast, web components in the enclave are blind to the outside world in an untrusted view—such as is shown FIG. 5(b).

Some tools for isolation will now be described. Next, the design of the enclave will be discussed in more detail, and it will be considered why the present design works well for the present threat model. Finally, the detailed implementation of security channels between enclaves will be discussed.

Available Primitives

We made a comprehensive study of existing web-based techniques to find promising tools for isolation:

Shadow DOM: shadow DOM provides the encapsulation of HTML elements and CSS in a web component. Once an element has the shadow DOM, the shadow tree is rendered instead of the children of the host element. Note that Shadow DOM is not designed for security or isolation, so it has no mechanism to control the access. These potential security issues can be mitigated to a degree, but some attacks can successfully access the protected components.

iframes: an iframe is a standard web component that can display an individual web page independently. It provides strong isolation based on the Same-Origin Policy (SOP), which prevents the script of the host page with different origins from obtaining access to the context within an iframe. Nonetheless, browser extensions can directly inject content scripts into the iframe regardless of the origin. Moreover, when the isolation was evaluated by using some iframe features such as sandbox, srcdoc, and data URL, none of them prevented the injection of content scripts.

Web accessible resources: developers can expose some necessary resources in a browser extension, including scripts, images, and icons, to the loaded page. These resources are available via the URL starting with "chrome-extension://", which can be generated with the extension-.getURL function. This unique URL can escape the interception from other extensions and deny the injection of content scripts. Nevertheless, these resources belong to the browser extension, so they can directly call privileged extension APIs.

Sandboxed Page: the browser extension sandbox is a safe mechanism to execute code in an isolation environment without access to the privileged extension APIs. The developer can create a sandboxed page by listing specific files in the manifest file of an extension. Once a sandboxed page is loaded, it has a unique origin and is denied access to chrome.* APIs. Due to the cancellation of privileges, the communication with a sandboxed page is limited to the window.postMessage function.

Design of the Enclave

To fulfil the design goals, a novel design of the enclave was created by repurposing the above-mentioned tools. Specifically, the independence between extensions is leveraged, that the WebEnclave extension denies access from other extensions. Since the privileged APIs are not available inside, a sandboxed page is used as the isolation zone to store the sensitive web contents customized by developers. To provide these components to users, the page is exposed by the mechanism of web accessible resources and embedded into an iframe for rendering. Finally, the Shadow DOM is used to accomplish the encapsulation of the enclave.

Figure 6:
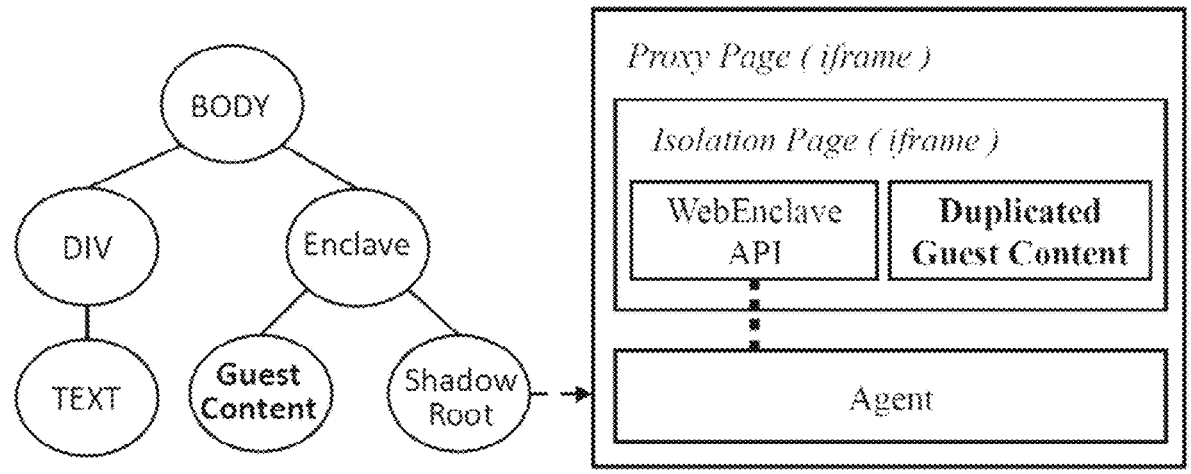
FIG. 6 is a schematic showing the construction of an enclave.

FIG. 6 is a schematic showing the construction of an enclave. As shown in this figure, the enclave is a custom web element that includes web contents designed by the developer. WebEnclave encapsulates the enclave by Shadow DOM and appends an iframe in the shadow root to embed the proxy page. The proxy page embeds the isolation page in an iframe and uses the agent module to maintain the communications.

The guest content refers to a collection of web elements in the enclave, including HTML elements, CSS styles, and Javascript. To render the enclave, WebEnclave copies all the guest content to the isolation page. Since the isolation page is set to be sandboxed, the duplicated guest content would not impact the functionalities of the WebEnclave extension.

Furthermore, two layers of iframes are nested, instead of directly embedding a sandboxed page to enhance isolation. Since the window.postMessage function is used to communicate with the isolation page, an attacker could otherwise eavesdrop on the data by registering an event listener to the iframe. With the proxy page functioning as the buffer area, the external scripts are denied to handle the events that occurred on the isolation page. While for the internal scripts, they can interact with the external world via the agent component in the proxy page.

Secure Communication

To ensure the confidentiality of the enclave, WebEnclave strictly manages inbound and outbound communication channels such as events, messages, requests, localStorage, and cookies. Nevertheless, a secure channel is ideally required to maintain communications necessary to the initialization and fundamental functionality. Thus, an approach is chosen for secure communication that supports the use of multiple enclaves and interactions across the enclave boundary.

Figure 7:
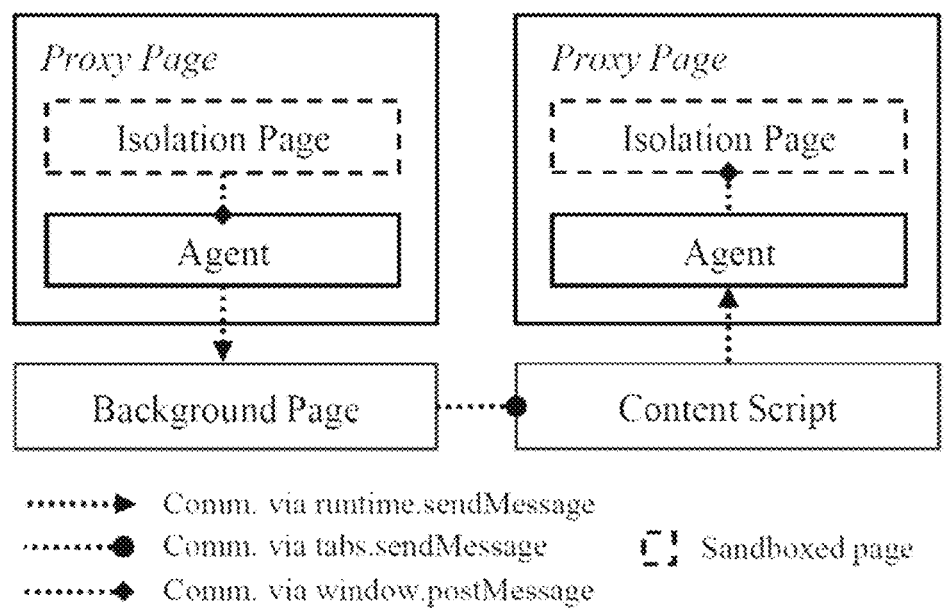
FIG. 7 is an illustration of the process of communicating between enclaves using a secure channel.

FIG. 7 is an illustration of the process of communicating between enclaves using a secure channel. The isolation page uses window.postMessage function to achieve the cross-domain communication with the proxy page. Since the proxy page belongs to the web accessible resources, it uses the runtime.sendMessage function to talk with the background page of the WebEnclave extension. WebEnclave maintains a global dictionary in the background page, which stores the correspondence among the enclave id, iframe id, and tab id. When the background page receives a communication request with the specific enclave id, WebEnclave queries the dictionary to find the corresponding tab id and iframe id. Then, it uses the tabs.sendMessage function to send messages to the content scripts. Similarly, the content scripts talk to the proxy page via the runtime.sendMessage function, and the proxy page uses the window.postMessage to interact with the isolation page. To handle complicated requirements, WebEnclave provides the executeByEnclaveId function for developers to inject codes in a specific enclave and return the result of the execution. Moreover, the developer can use the executeInHost function to execute Javascript codes in the context of the host webpage.

A process of integrity verification will now be described.

Verifying the enclave is necessary because the attacker could pollute the web page before the initialization of enclaves. Concretely, malicious extensions could intercept, block, or modify web requests with the webRequestBlocking permission, as well as inject scripts to perform modification on the web page. Therefore, existing functionality cannot protect the code in the enclave from tampering with by the malicious extensions. A security mechanism is required to ensure the integrity of the codes in the enclave when WebEnclave starts to build enclaves.

Verification Protocol

In the threat model, it is assumed that the web server, the browser, and the WebEnclave extension are all trusted and robust. However, after receiving responses from the web server, the malicious extension could modify the response before the rendering of the page. In other words, the attacker could tamper with the codes in the enclave (for example, delete enclave elements) before the initialization of the enclave. Thus, without the integrity guarantee, an adversary could bypass the boundary to access or modify the codes in the enclave.

Figure 8:
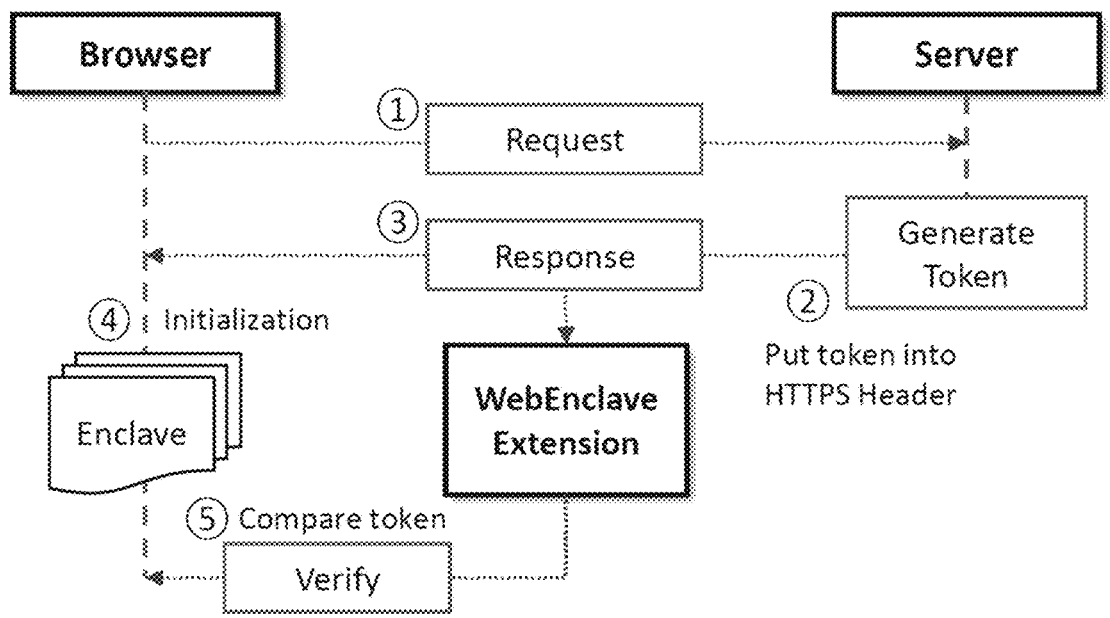
FIG. 8 is an illustration of the data flow of the verification protocol.

FIG. 8 is an illustration of the data flow of the verification protocol. A verification protocol was designed to resolve the integrity problem by verifying the enclave. Before the response, the server generates the token based on the enclave elements on the web page. Next, the token is attached in the response as a custom HTTP header "X-Enclave" and sent to the browser. After the initialization of enclaves, the present extension begins to perform the verification with the token. In more detail, the WebEnclave extension uses the same algorithm of generating tokens to calculate the result of enclaves in the loaded page and compares it with the token acquired from the response header. The verification is passed only if the token and the calculation result are equal. To protect the user secrets, the WebEnclave extension performs a URL redirection to a warning page if the verification fails.

For implementing the present protocol, one challenge is to keep the token intact and not tampered with by malicious extensions. To this end, WebEnclave uses a custom HTTP header to store and transfer the token, which ensures integrity. Based on the mechanism of browser extensions, when multiple extensions intercept web requests by the chrome.webRequest API, all the corresponding listener functions would be called simultaneously when the browser receives a response. Thus, the WebEnclave extension can read the real token before potential modifications by malicious extensions.

First it was considered to use a digital signature based on public-key cryptography as the token to perform the verification. In this case, the developer uses the private key to generate the signature, and WebEnclave uses the corresponding public key to verify it. This design works well for the verification requirements but introduces lots of additional overheads in practical scenarios. Since every domain needs an individual key, WebEnclave has to maintain all the public keys, which leads to an observable increment of the operation cost. Furthermore, the private key is required for generating tokens, so the web server also needs additional overhead to protect the key. Moreover, the performance overhead of the public-key cryptography is not negligible for both web servers and browsers.

Instead, WebEnclave builds the token based on the message digest. A message digest is a fixed size-digits representation of arbitrary size contents, computed by a one-way hashing formula. It is designed to protect the integrity of the contents by detecting alterations to any part of a message. Considering the assumption that the server-side is trusted and robust, both the token and web pages are protected before leaving the server. Moreover, based on the threat model, the user always uses HTTPS to visit websites, which ensures the security of the network channel. The present security mechanism can ensure that WebEnclave extension reads the token correctly. As a consequence, the message digest fulfils the requirement of the token with minimized cost.

Figure 9:
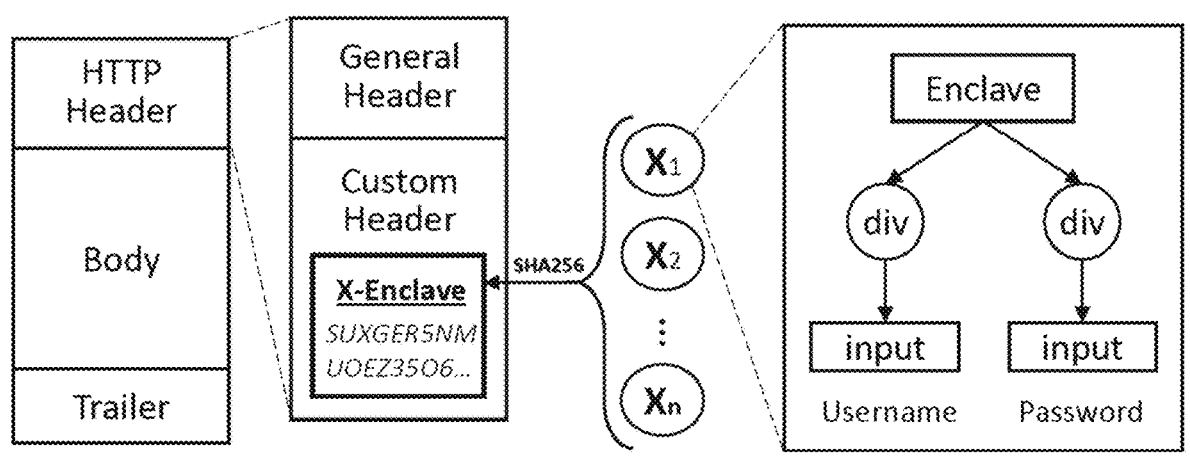
FIG. 9 is a schematic of the architecture of the verification token.

FIG. 9 is a schematic of the architecture of the verification token, and presents the architecture of the token. The token is the hash value of all the contents in the enclave and stored in the custom HTTP header "X-Enclave". In the present system, SHA256 is used as the cryptographic hash function to calculate the hash value. When the browser receives the web response from the server, the WebEnclave extension obtains the token by interception of requests and injects content scripts to process the verification of enclaves. Algorithm 1 below presents the pseudocode of the verification process. In more detail, WebEnclave uses DOM API to collect all the enclave elements and concatenates their HTML codes. By using the same cryptographic hash function, WebEnclave calculates the digest of the combined codes and makes a comparison with the token. The enclaves are proved to have not been tampered with if the digest is equal to the token.

Algorithm 1: Verify the Enclave with Token
   Require: the token t; the window object win;
   Ensure: a boolean B represents if pass the verification;
code.verify
    1: e←win:getElementsByTagName('web—enclave');
    2: content←string
    3: n←e:length;
    4: for i∈{0, n} do
    5: content.concat(e[i].outerHTML);
    6: end for
    7: digest←sha256(content);
    8: B←compare(t, digest);
    9: Return B;

WebEnclave Middleware

To support the verification protocol, the developer needs to implement the whole process that calculates the token for every web page and appends it to the response header. To reduce the workload of developers, the WebEnclave Middleware has been designed, which independently implements the work required by the verification protocol. The WebEnclave middleware is a reverse proxy that automatically analyzes HTML codes of the response, calculates the token, and puts it into the response header. Since the middleware is an independent service that processes the HTTP/HTTPS requests, it is compatible with existing web servers and backend frameworks. Algorithm 2 below shows the pseudocode of the middleware.

Algorithm 2: WebEnclave Middleware Implementation
   Require: HTTP request req, HTTP response res;
   function(req, res)
    1: html←res:responseHTML;
    2: r←RegEx(<web—enclave:*?</web—enclave >);
    3: arr←r:matcheAll(html);
    4: content←arr.join( );
    5: digest←sha256(content);
    6: res.setHeader('x—Enclave', digest);
    7: Return res;

The security of the functionalities of the system will now be described in more detail.

The present design aims to support functionalities required to develop a secure web application, such as the UI, script execution, web APIs, and cookie management. Due to the isolation strategy, most web features and APIs are no longer functional in the enclave. To achieve the usability goal, many efforts have been made to retain these functionalities.

User Interface

To reduce the development cost, WebEnclave allows the developer to design the web UI as usual. Developers only need to encapsulate the sensitive HTML codes with the <web-enclave> tag. To achieve this, WebEnclave ensures that the rendered UI of the HTML codes is consistent regardless of whether in the enclave. Maintaining a consistent UI means that both the DOM elements and corresponding CSS styles are the same. A straightforward approach is to duplicate the HTML codes and styles into the enclave. Nevertheless, the present isolated strategy breaks the document structure, making some CSS selectors invalid, such as descendant combinator and child combinator, and finally lead to different appearances.

To apply the same appearance to the enclave, WebEnclave uses the computed styles instead of the developers' CSS description to rebuild the UI. As shown in Algorithm 3 below, WebEnclave recursively calculates the styles of the web elements in the enclave via the window.getComputedStyle API. When initializing the enclave, WebEnclave sets the styles back to the corresponding element in the enclave to recover the appearance.

Algorithm 3: Capture styles
   Require: the enclave node N in host page;
   Ensure: styles array S
code.Capture
    1: S←Array
    2: n←N.children.length;
    3: for i∈{0, n} do
    4: res←code.capture(N.children[i]);
    5: S.push(res);
    6: end for
    7: style←window.getcomputedstyle(N);
    8: S.push(style);
    9: Return s;

Apart from the CSS style, an element's rendering is related to its parent node and child node. For instance, the position property defines how to place the child node, and the boxsizing property sets how the total width and height of an element is calculated. Our isolation strategy separates the outermost web element in the enclave from the parent node, which impacts the presentation of the enclave, especially the location and size.

Figure 10:
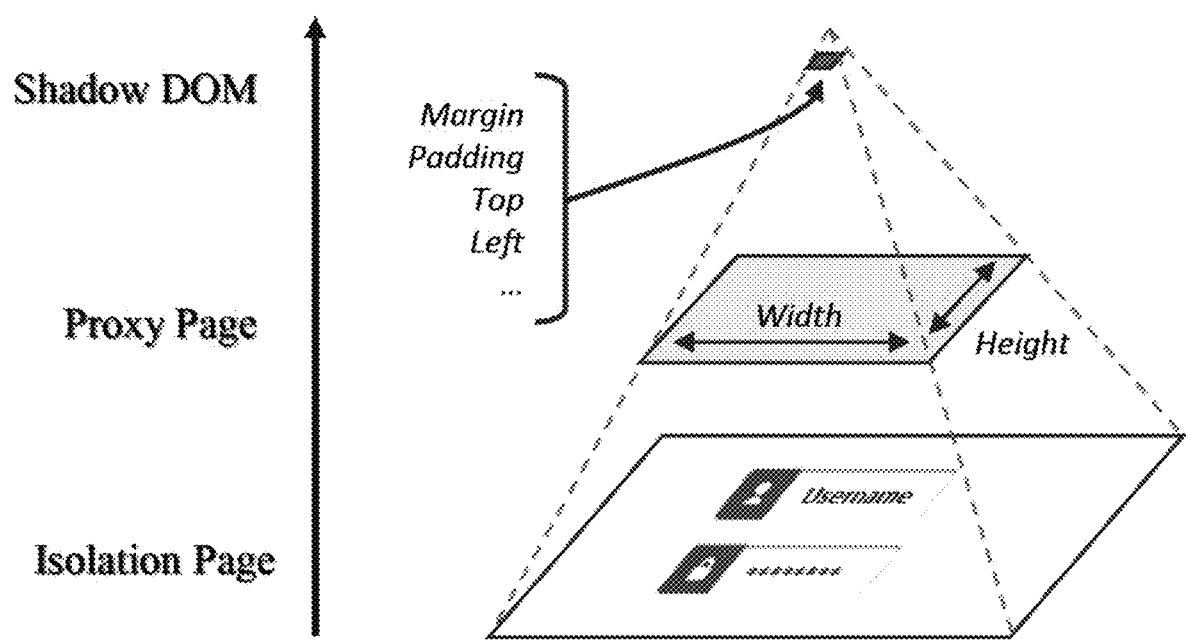
FIG. 10 illustrates the correction of the style of an outermost web element.

FIG. 10 demonstrates the method of correcting the style of the outermost web element. Specifically, WebEnclave uses the shadow DOM to fix the position of the enclave, which makes the replacement seamless. WebEnclave calculates the width and height of the enclave outline based on the CSS properties including width, height, boxsizing and padding, then respectively sets the value to corresponding property of the proxy page.

Browser Object Model

Due to the isolation strategy, some functions and attributes would no longer be valid in the enclave, such as history.go and location.href. Though WebEnclave aims to maximize compatibility with existing development interfaces, it is not easy to provide the same API as the original usage. To mitigate this issue, it is necessary to make modifications to retain existing Browser Object Model (BOM) interfaces, such as the window, location, and history. By using the extend keyword in the script element, developers can use web features via the original interface as usual. Moreover, a generalWebEnclave API is specifically provided for development requirements in complex scenarios.

Functions: to enable the functionality, WebEnclave delegates some BOM functions to the host page to execute. A protocol was created to execute these functions in the content script and then return the result to the enclave via secure communications. The content script runs in the context of the host page to access the DOM elements and lives in an isolated world that avoids being polluted by malicious codes. Moreover, the communication channel is secure so that no data will be leaked during this process.

Considering that WebEnclave uses the asynchronous function window.postMessage to implement secure communication, the outbound channel has to be asynchronous also. Nevertheless, some BOM functions are synchronous, which can make it challenging to maintain the original usage. Moreover, the parameter and return of some specific BOM functions are not serializable or transmissible. Thus these functions are also not available. To supplement the functionality, WebEnclave provides the executeInHost API, which is an asynchronous function to execute codes on the host page and return the result of the execution.

Attributes: since the enclave is an isolated world independent of the host page, WebEnclave needs to ensure the consistency of BOM attributes among all enclaves. Thus a protocol was created between the enclave and host page to maintain a global state of BOM attributes. Concretely, WebEnclave uses the BOM attributes of the host page as the initial value to synchronize all enclaves. Once a modification of these attributes is detected, WebEnclave will immediately broadcast the change to the host page and all enclaves to update the value. The present design produces a short "update period" during which inconsistent BOM attributes may appear. Based on our evaluation, this specific period for synchronization is around 15 ms, which is negligible in most scenarios.

Overwritten: as some native objects are not allowed to be redefined or overwritten, original functions or attributes cannot be seamlessly replaced with a desired new implementation. To remain the same interface as before, the with statement is used to extend the scope chain of the code in the enclave. Javascript objects resolve identifiers by traversing up the scope chain from local to global. The global scope is the window and most BOM objects such as history and location belong to the window. Due to the modification of the local scope, the codes in the enclave use the present new implementation when calling some specific web APIs.

Web Cookie

The cookie is a piece of stateful information stored in the browser and widely used in session management, personalization, and tracking. In cookie attributes, the Domain and Path properties define the scope of a cookie, indicating a specific website it belongs to. When the browser receives the response from the server, it would modify the cookie according to the value of the set-cookie header. Similarly, when a request is made, if the origin of the request is equal to the domain of the cookie, the cookie will be automatically carried. Since the enclave has a unique domain that is different from the host domain, so the cookie is not available for the web components in an enclave.

To retain this functionality, the WebEnclave extension re-implements the cookie system compatible with the web standard. Consequently, WebEnclave creates a dictionary to store the information of cookies in local and maintains the cookies by the interception of the inbound and outbound requests. To make the storage of the dictionary persistent, WebEnclave uses the storage.local APIs to achieve offline storage. Algorithm 4 below lists the pseudocode that WebEnclave handles both onBeforeSendHeaders and onHeadersReceived events to manipulate the cookies.

Algorithm 4: Webrequest API Processes Cookie
Require: local storage for cookie dict; headers array Arr;
onHeadersReceived(Arr)
1: n←Arr:length;
2: for i∈{0, n} do
3: if Arr[i].name='set—cookie' then
4: dict.set(Arr[i].name, Arr[i].value);
5: end if
6: end for
onBeforesendHeaders(Arr)
1: cookiestr←cookie:stringify(dict);
2: n←Arr:length;
3: for i∈{0, n} do
4: if Arr[i].name='cookie' then
5: Arr[i].value=cookiestr
6: end if
7: end for A security analysis of the system will now be discussed.

In this section, we discuss some possible attacks under the proposed threat model that could compromise our security mechanism and steal user secrets.

Attacks on Data Confidentiality

Unauthorized Access: a straightforward attack is to access the document and Javascript variables in the enclave directly. As mentioned, our design of the enclave denies all access to the inside content so that even in a compromised host page, the sensitive data in the enclave will not be a leak. Besides, the privileges of malicious extensions are also not working to the enclave. For example, an attacker cannot leverage content scripts or the executeScript API to execute malicious scripts in the enclave. Moreover, the enclave is running as an independent web page under a unique domain. Thus, the inside Javascript runtime and environment variables such as the cookie and BOM objects cannot be accessed from the outside.

Network Eavesdropping: a malicious extension running with the webRequest permission and corresponding hosts declared has the ability to observe and analyze web traffic. It can use the chrome.webRequest API to intercept, block, or modify both HTTP and HTTPS requests. As a result, the attacker could perform a man-in-the-browser attack stealing secrets from the responses and manipulating the requests to web servers. However, this attack will fail because the present ensures that any requests or responses related to the enclave are denied to read or tampered with. Extensions except WebEnclave will not even know the existence of communication between the enclave and the web server.

Event Hijacking: an attacker who controls the Javascript runtime could leverage an event listener to attach an event handler to the specified event so that he can obtain some sensitive information of user behaviours. For example, by monitoring the keypress and mousemove event, the attacker may record user keystrokes and mouse tracks. To avoid such malicious eavesdropping, WebEnclave disables the event bubbling in the enclave so that all events will terminate at the root of the iframe document and will not travel across the boundary into the host document.

Attacks on Integrity

Enclave initialization Attack: this attack aims to prevent WebEnclave from initializing the enclave by tampering with the host document. For example, the attacker may break the <web-enclave> tag so that our initialization step cannot recognize the component to be protected. Note that such modification on host document, such as delete the tag, tamper the content or swap the order, will not pass the integrity verification based on our proposed verification protocol. WebEnclave forcibly redirects the host page to a warning prompts once receiving the failure of integrity check.

UI Spoofing: in this type of attack, the attacker creates a fake UI and tricks the user into operating on it. Due to the full control of the host page, this attack can be achieved by modifying the DOM tree and component style, for example overlaying a fake UI on top of the enclave. WebEnclave ensures the integrity of the enclave via our proposed verification protocol but cannot guarantee that the user always makes sensitive operations in the enclave. To mitigate this attack, a specific indicator is placed in the toolbar to remind the user whether the current focus is in the enclave. Since the indicator cannot be imitated or tampered with, the user can confirm that the currently focused web part is secure by checking the status of the indicator.

Attacks on WebEnclave Extension Extension Disabling Attack: the security assurance relies on the WebEnclave extension, which needs to keep running when a user browses the web. In this attack, the attacker tricks the user into disabling the WebEnclave extension to disable our security mechanism. Specifically, the malicious extension manipulates the host page to display an inflammatory warning that induces users to disable all extensions. Due to the mechanism of the browser extension, we cannot prevent users from disabling extensions. To mitigate this attack, we clearly highlight that security protection will be lost once the WebEnclave extension is disabled, for example by providing a prompt after the user first installs theWebEnclave extension.

Compromising WebEnclave Extension: The WebEnclave extension has the risk of being compromised like other browser extensions. Once it is cracked, it will fail to protect the user's secrets and cause the host page to be fully compromised. Due to the strong isolation, an attacker will fail to compromise or even access the WebEnclave extension from the host page or malicious extension. A promising attack is to elaborate malicious codes in the enclave to attack the WebEnclave extension. However, based on the present design, the enclave has independent runtime and domain that cannot directly interact with the WebEnclave extension.

An experimental evaluation of WebEnclave will briefly be described.

We implement WebEnclave as a Chrome extension and build the middleware as a reverse proxy service on top of Node.js. In order to make it usable for practical scenarios, the implementation is optimized to reduce the performance cost of using the enclave. On the server-side, the provided middleware also adapts all major web service software, including Apache, IIS, and Node.js, and supports multiple platforms such as Windows and Linux. All the codes are open-sourced on Github.

In this section, we first evaluate the initialization of the enclave in different scenarios, such as containing vast UI elements, using multiple enclaves, and working with famous CSS and Javascript frameworks. Moreover, we measure the request latency and throughput of the WebEnclave middleware to introduce the impact on the server-side. To make it complete, we also test web functionalities and features in enclaves, such as BOM APIs. Finally, we provide concrete analysis with the Google login page to illustrate the tradeoff among security, developing workload, and performance impact.

Evaluation of the Enclave

We conducted the tests on a PC with Intel I7-5960X (3.00 GHz×8 cores) CPU and 32 GB RAM. To mitigate the network impact, we deployed the web and middleware in local. The web server is built on top of Express 4.17, and the browser is Google Chrome 80.0.3987 installed in Microsoft Windows 10 Build 17134.

We built static web pages that contain our provided enclave elements, and each enclave included different UI elements according to the test case. To make our evaluation results more useful, we evaluated the web page by browsers with WebEnclave installed and used the Chrome DevTools to measure the load time and memory consumption. The load time represents the duration between opening the web page and finishing the rendering. The memory consumption counts the actual size of allocated objects rather than the total heap size in the Javascript virtual machine. Note that all the tests are running with cache disabled.

UI Elements: we observed that for most UI elements, using WebEnclave increases the load time by merely around 100 ms, which primarily serves the verification of integrity, the initialization of the enclave, and the rendering of the UI. Two exceptions are the video and audio elements because they require to download additional resources, which delay the initialization of the enclave. Even so, the overall delay is within a reasonable range and barely affects the user experience.

As the rendering in browsers is not sequential, it is necessary to evaluate the performance when an enclave contains a large number of UI elements. In order to normalize the test benchmark, we defined the combo as a collection of all major UI elements mentioned above (total 63 elements). We discovered that as the number of combos increases, the load time slowly grows. In particular, when the number of UI elements in the enclave reached a certain amount, for example eight combos (about 512 elements) in our evaluation, the additional time overhead caused by WebEnclave becomes negligible. According to the logging details, the time for initialization of the enclave mostly keeps stable, while the overhead of downloading related resources, such as images and videos, dominates the load time. In conclusion, when to build complex web applications with numerous UI elements, the enclave would not be the bottleneck of the load time.

Aside from the time consumption, we also considered memory consumption when rendering 1 to 10 combos. To make it clear, we define the host page as the web page containing the enclave, and the enclave page refers to the presenting page within the enclave. It was found that memory consumption stays the same without using WebEnclave. On the other hand, the memory cost of both the host page and the enclave page is increasing very slowly. Though the inside UI elements increase to approximately 600, the actual memory consumption is only 466 KB. For modern PCs, these memory consumptions are acceptable for most practical usage scenarios.

Multiple Enclaves: to meet complex requirements, web developers sometimes need to install multiple enclaves on a web page. We evaluated the web page that contains multiple enclaves, and each enclave includes a combo. Compared with browsing without WebEnclave, the load time using WebEnclave increases by around 400 ms. As the number of enclaves increases, for both cases, the load time keeps growing, and the growth rate is approximated. Moreover, when presenting the same UI elements, using multiple enclaves increases the appropriate 15% additional load time, which will not significantly affect the user experience.

We observe that with the number of enclaves growth, the memory size of both the host page and the enclave page increases obviously, while the control group without WebEnclave remains constant. Specifically, when using WebEnclave, the total memory consumption increases from 418 KB until it reaches a maximum value of 679 kb. Without WebEnclave, the memory cost keeps fixed at 141 kb. In practical scenarios, we rarely create more than 10 enclaves, so the overhead of memory is constrained to less than 700 kb per page.

Style Elements: in modern web applications, CSS frameworks are widely used to enhance the user experience and reduce the developing overhead. In order to understand the impact of CSS style on the enclave, we used the top 5 CSS frameworks in Github to conduct the tests. All the test web pages are templates from the official documents of these frameworks, and the only modification we made was inserting the enclave element to wrap all the UI elements. As a result, the web page provides the same appearance and experience regardless of whether users install the WebEnclave extension. We observed that for different CSS frameworks, the additional load time caused by WebEnclave differs but within an acceptable range. For memory consumption, the impact of CSS frameworks is negligible.

Script Elements: we also measured the performance of enclaves with well-known javascript frameworks, including AngularJS, React, Vue, and so on. We built the test web page based on their official examples and make necessary modifications (less than 10 lines) to adapt the enclave. All test web pages provided a consistent browsing experience no matter whether the visitor installed the WebEnclave extension. The results illustrated that using a complex javascript library or even a Model-View-ViewModel (MVVM) framework will not dramatically impact the enclave. It is practical for developers to build secure interactive web applications with enclaves.

Performance of the Middleware

We conduct the evaluation via AmazonWeb Services (AWS) to measure the request latency and throughput of the middleware. To initialize the testbed, we create two AWS c5d.xlarge (4 vCPUs, 3.4 GHz, 8G memory) instances with Ubuntu Server 20.04 installed. One instance is treated as the client, leveraging a professional website testing tool to benchmark the middleware. Concretely, we use the Apache ab tool to simulate the scenario that a large number of users are continuously sending web requests to the middleware. To make it more precise, we repeat the test with different rates of sending web requests and take the minimum latency and maximum throughput as the final result.

The other instance is deployed to be the web provider, installing the web server, the middleware, and the reverse proxy. As usual, the web server hosts static web pages with different numbers of enclaves inside, and each enclave includes a combo. Since the middleware uses the mechanism of reverse proxy, we deploy a transparent reverse proxy as a control group to emphasize the additional overhead generated by the middleware. Note that in our evaluation, all the server-side tests are running in the single thread model.

Latency: We observed that the time to access the static web server directly is kept at around 300 μs, while for the scenario of using a reverse proxy, the time consumption was around 550 μs. Furthermore, the latency of accessing the middleware increased from 629 μs to 1127 μs as the number of enclaves grew. This is because the middleware needs extra operations to process the enclave. Compared with the static web server, the middleware had an additional delay of at most 798 μs, which is negligible in practical applications.

Throughput: with the number of enclaves increasing, the throughput of all three schemes decreases gradually. This is because the performance of the static web server is affected by the size of the web pages. Furthermore, using more enclaves generates additional workload for the middleware, which makes the throughput drop faster. Note that only the web pages with enclaves are required to pass the middleware, and other pages can be processed as usual. So the reduction in the throughput of the middleware is acceptable in practical use.

Measurement of the Functionalities

WebEnclave re-implements the Web APIs in the enclave to restore the functionalities but inevitably introduces additional latency. We carefully used the Chrome DevTool to measure the time consumption of representative functions and attributes. Except for the open function, the time consumption of performing operations outside the enclave was within 1 ms, but the time cost grew to 10 to 15 ms in the enclave. In other words, the additional time overhead caused by the enclave is between 10 to 15 ms.

Some development guidelines will now be discussed. In this section, we use a login page as a demo to illustrate how to develop and deploy a secure web application with WebEnclave.

Code Extract 2 below shows the source code of the login page. We can see two input elements respectively for collecting username and password, and a button element for clicking to login. Also, the inline CSS style decorates the div element.

```
<web-enclave>
<div id="loginDiv">
    username: <input id="user"/><br/>
    Password: <input id="psw" type="password"/><br/>
    <button onclick="login( )">Login</button>
</div>
<style>
    #loginDiv{
        padding:10px;
        width:250px;
        border:1px solid red;
        line-height:40px;
    }
</style>
...
</web-enclave>
```

Code Extract 2: The UI Part of the Enclave

Comparing to an ordinary web page, the difference is using the <web-enclave> tag. A fundamental usage of WebEnclave is to put sensitive codes, including HTML, Javascript, and CSS, into the enclave. By default, the HTML elements in the enclave are dressed up by both the CSS styles inside and outside.

To implement the login logic, we put the script element in the enclave and write corresponding Javascript codes inside. As needed, developers can import third-part libraries to the enclave for more functionality, such as the Jquery in our example. As shown in Code Extract 3 below, developers are allowed to write individual codes for browsers with and without WebEnclave installed.

```
<web-enclave>
...
<script src="jquery-3.5.1.min.js"></script>
<script extend final>
function login( ) {
    //your login logic here
}
if (window['$we']) {
```

```
//only run with webEnclave installed
}
if  (!document.documentElement.getAttribute('webEn-
    clave')
    && !window['$we']) {
    //only run without webEnclave installed
}
</script>
</web-enclave>
```
Code Extract 3: The Logic Part of the Enclave Developers can apply specific keywords on script elements to enable more features provided by WebEnclave. For example, the script with the final keyword will be executed after the execution of other scripts. Moreover, the extend keyword enhances the compatibility in the enclave to restore the former usage of web APIs. For example, developers can use the following two methods in the enclave to go back.

//with extend in <script>
history. go(-1);
//without extend in <script>
$we.env.history.go(-1);

We can see that with the extend keyword, developers can execute a specific web API in the host page by calling the same function in the enclave.

Deployment

To enable the present security features, developers are recommended to use the WebEnclave middleware on the server-side. The middleware runs like a reverse proxy service that retrieves resources on behalf of a client and automatically adds security support to requests. Developers can use the following command to start the middleware:

node m.js--src=A--p=80--des=B--o=8080

In the above example, the middleware provides secure web service in server A on port 80, and the original web server is deployed in server B on port 8080.

To the best of our knowledge, the above-described system is the first practical solution to protect sensitive web parts from malicious extensions that have full privileges guaranteed. The present design ensures WebEnclave becomes a lightweight solution in the sense that it does not rely on hardware or a modified browser and the OS. The users only need to install the WebEnclave extension, while the developers can also use WebEnclave middleware to deploy secure web applications with relative ease. Moreover, WebEnclave balances the trade-off between security and functionality. Preliminary results from the comprehensive evaluation confirm that WebEnclave incurs negligible perception changes for users to browse in most scenarios.

Much of the description above has focused on one particular browser, but it will be appreciated that the general principles can be applied to other browsers with appropriate adjustment. It will be appreciated that the principles described above in relation to Javascript may apply equally to any other language or script which finds use in relation to content downloaded to web browers.

It will be appreciated that further modifications may be made to the invention, where appropriate, within the spirit and scope of the claims.

The invention claimed is:

1. A method of preventing privileged web browser extensions installed in a web browser from interfering in interactions between a user of the web browser and a web application server accessible via the web browser, the method comprising:
   at the web application server, transmitting a web browser-intelligible file to the web browser, the file including a custom element that designates a portion of the file as an enclave portion, a content of which is desired to be protected from interference by privileged web browser extensions;
   at the web browser:
      processing the file to identify the enclave portion;
      creating a sandboxed page;
      copying at least part of the enclave portion to the sandboxed page to create a local enclave;
      embedding the sandboxed page in a first iframe for rendering;
      embedding the first iframe in a second iframe;
      providing an application programming interface, API, for the local enclave using web-accessible resources for access to entities outside the local enclave;
      providing a software agent in the second iframe to act as a proxy between the first iframe and external entities;
      encapsulating the second iframe in a shadow document object model, DOM, associated with a host page; and
      disabling event bubbling in the local enclave so as to prevent event hijacking,
   whereby the local enclave can be displayed to the user and interacted with by the user, but is protected from interference by the privileged web browser extensions.

2. A method according to claim 1, wherein the transmitted file includes a plurality of enclave portions, and the method comprises creating a separate sandboxed page, iframe and shadow DOM for each enclave portion.

3. A method according to claim 1, further comprising providing, at the web browser, a web browser extension programmed to carry out at least one of the steps of: processing the file, creating a sandboxed page, copying at least part of the identified enclave portion, providing an API, embedding the sandboxed page, and encapsulating the iframe.

4. A method according to claim 1, further comprising:
   at the web application server, generating a first verification token whose value depends on the content of the enclave portion, and transmitting the verification token to the web browser; and
   at the web browser:
      after the local enclave is created, generating a second verification token whose value depends on the content of the local enclave;
      comparing the first verification token and the second verification token; and
      outputting an alert if the first verification token and the second verification token do not match.

5. A method according to claim 4, wherein generating the first and second verification token comprises generating a message digest of the enclave using a hashing function.

6. A method according to claim 4, further comprising, at the web application server: receiving a request for content from the web browser, and generating the web browser-intelligible file in response to the request for content, wherein the first verification token is included within the file before it is transmitted to the web browser.

7. A method according to claim 4, further comprising, at the web application server, providing a verification proxy module that is programmed to:
   receive the generated web browser-intelligible file;
   carry out the step of generating the first verification code;
   insert the first verification code into the file; and
   output the file for transmission to the web browser.

8. A method according to claim 1, further comprising, at the web browser, processing the contents of the local enclave to correct for any modifications in appearance caused by moving it to the local enclave.

9. A method according to claim 8, further comprising:
using the shadow DOM to determine the position of the contents of the local enclave; and
adjusting style settings for the first iframe in dependence on the determined position.

10. A method according claim 1, further comprising providing, at the web browser, an API to execute code on the host page and to return results of the code execution to the sandboxed page.

11. A method according to claim 1, wherein creating the sandboxed page further comprises copying at least one browser object model attribute to the sandboxed page from the host page; and wherein the method further comprises detecting a change to a browser object model attribute on the sandboxed page, and copying the changed browser object model attribute back to the host page.

12. A method according to claim 1, further comprising, at the web browser, handling events relating to cookie data so as to provide cookie functionality to the sandboxed pages as if they were in the same domain as the host page.

13. A method according to claim 12, wherein handling events relating to cookie data further comprises handling onBeforeSendHeaders and onHeadersReceived events for both the host page and the sandboxed page, so as to maintain a mirror copy of the cookie data and to transmit the correct version of the cookie data when required.

14. A method according to claim 1, further comprising, at the web browser, executing a script in the sandboxed page after the execution of other scripts, on detection of a first specific keyword.

15. A method according to claim 1, further comprising, at the web browser, executing a script in the sandboxed page while providing the API of the host page, on detection of a second specific keyword.

16. A method according to claim 1, further comprising, at the web browser, causing a specific indicator to be displayed in the toolbar to indicate whether the current focus is in a local enclave.

17. A web browser extension system for preventing privileged other web browser extensions installed in a web browser from interfering in interactions between a user of the web browser and a web application server accessible via the web browser, the web browser extension system comprising:

a processor;

a memory storing a processing module, an enclave creation module, and an application programming interface (API), wherein the processing module, when executed on the processor, configures the processor to process a received web browser-intelligible file, wherein the web browser-intelligible file includes a custom element that designates a portion of the file as an enclave portion, wherein a content of the enclave portion is desired to be protected from interference by privileged web browser extensions, and wherein processing the file comprises identifying the enclave portion;

wherein the enclave creation module, when executed on the processor, configures the processor configured to create a sandboxed page, to copy at least part of the enclave portion to the sandboxed page to create a local enclave, to embed the sandboxed page in a first iframe for rendering, to embed the first iframe in a second iframe, to provide a software agent in the second iframe to act as a proxy between the first iframe and external entities, to encapsulate the second iframe in a shadow document object model, DOM, associated with a host page, and to disable event bubbling in the local enclave so as to prevent event hijacking; and wherein the application programming interface, when executed on the processor, configures the processor for providing to provide access from the sandboxed page to entities outside the local enclave, wherein the API comprises web-accessible resources, whereby the local enclave can be displayed to the user and interacted with by the user, but is protected from interference by the privileged web browser extensions.

* * * * *